United States Patent [19]

Eldridge et al.

[11] Patent Number: 5,588,728
[45] Date of Patent: Dec. 31, 1996

[54] PORTABLE DISK DRIVE CARRIER AND CHASSIS

[75] Inventors: Robert A. Eldridge, Beaverton; Ed J. Unrein, Lake Oswego; David L. Brown, Milwaukee; Scott L. Noble, Beaverton, all of Oreg.

[73] Assignee: Intel Corporation, Santa Clara, Calif.

[21] Appl. No.: 580,489

[22] Filed: Dec. 29, 1995

Related U.S. Application Data

[63] Continuation of Ser. No. 346,039, Nov. 29, 1994.
[51] Int. Cl.⁶ .......................... A47B 95/02; H01R 13/62
[52] U.S. Cl. .................. 312/332.1; 439/157; 312/223.1
[58] Field of Search .................. 312/332.1, 223.2, 312/330.1, 333, 334.23, 334.24, 334.27, 334.26; 211/26; 361/685, 724, 725, 726, 727, 732, 740; 439/152, 155, 157, 325, 327, 328, 345

[56] References Cited

U.S. PATENT DOCUMENTS

| | | | |
|---|---|---|---|
| 2,944,864 | 7/1960 | Krivulka | 312/332.1 |
| 3,039,837 | 6/1962 | Poe | 312/332.1 |
| 3,120,412 | 2/1964 | Caldwell | 312/332.1 |
| 3,367,732 | 2/1968 | Beye | 312/332.1 |
| 4,003,614 | 1/1977 | Geer et al. | 312/332.1 |
| 4,999,744 | 3/1991 | Blankenship | 439/64 X |
| 5,340,340 | 8/1994 | Hastings et al. | 312/223.1 X |
| 5,379,184 | 1/1995 | Barraza et al. | 312/332.1 X |
| 5,385,870 | 1/1995 | Maue et al. | 439/157 |
| 5,395,258 | 3/1995 | Okumura et al. | 439/157 |

Primary Examiner—Peter M. Cuomo
Assistant Examiner—James O. Hansen
Attorney, Agent, or Firm—Blakely, Sokoloff, Taylor & Zafman

[57] ABSTRACT

A hard disk drive carrier that is inexpensive to manufacture and suitable for use with hot plug connected hard disk drives. A composite ventilated bay secures the disk drive while an interlocking handle mechanism provides the carrying functionality for the hard disk drive carrier as well as the hardware for one-hand locking and unlocking of the carrier within a hard disk drive chassis.

14 Claims, 4 Drawing Sheets

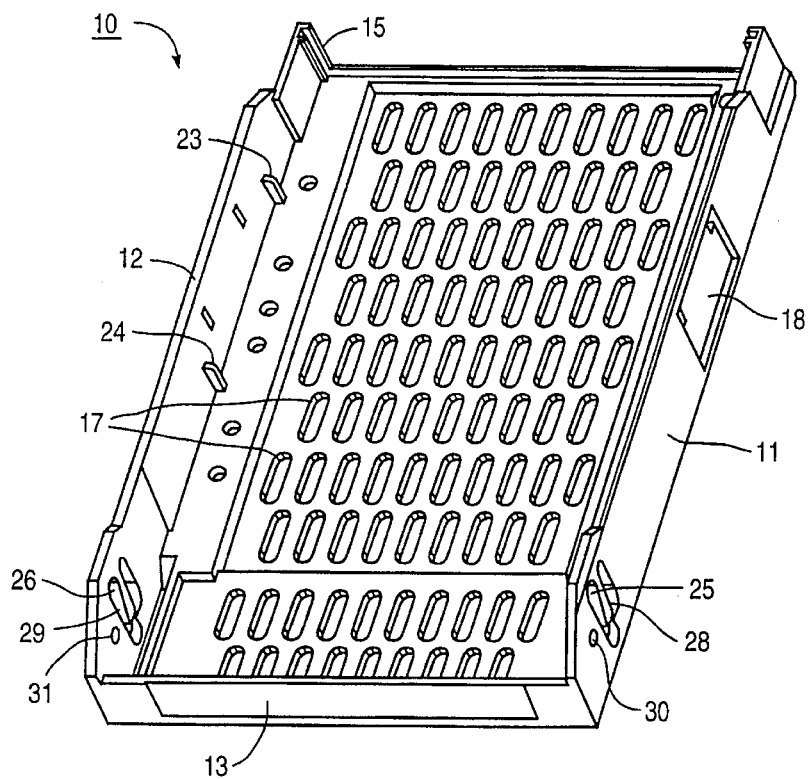
FIG_1A
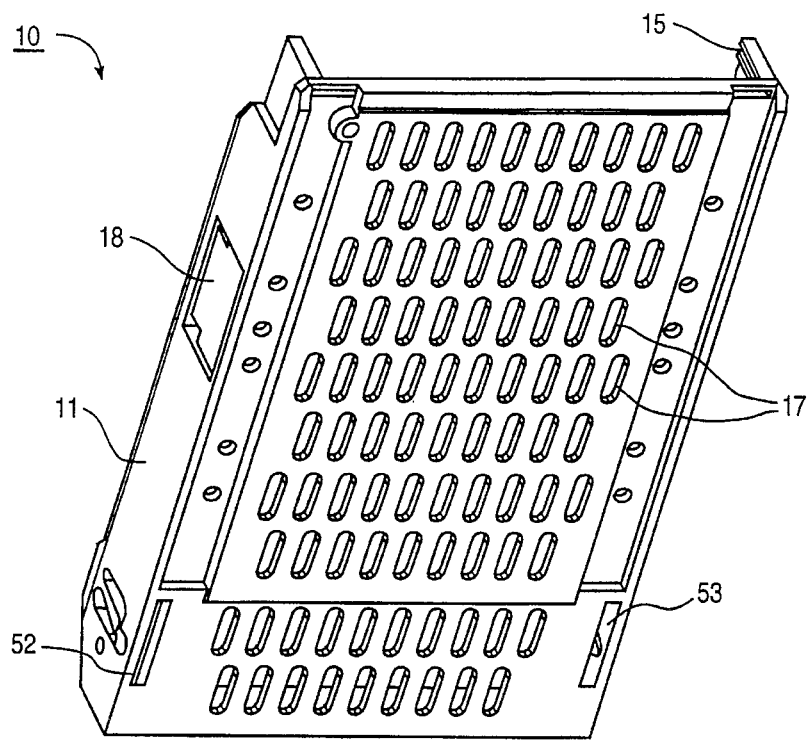
FIG_1B

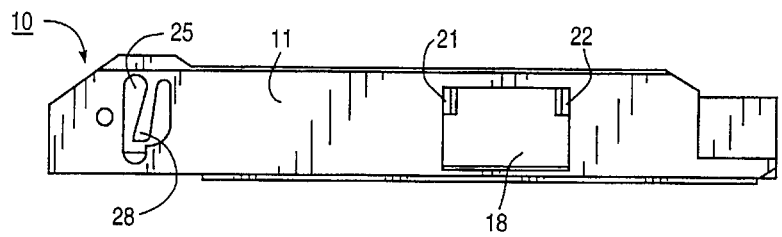
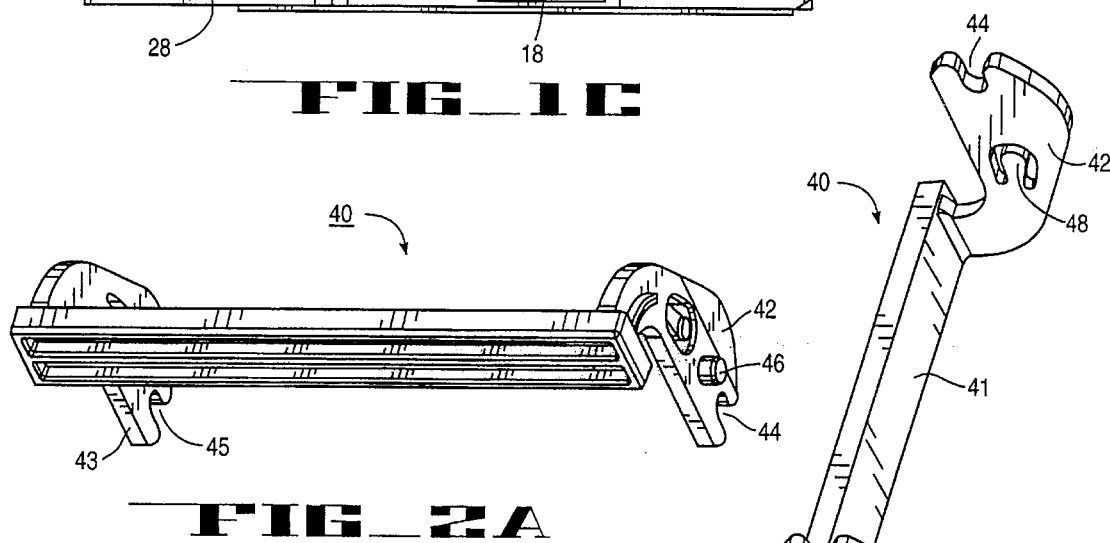
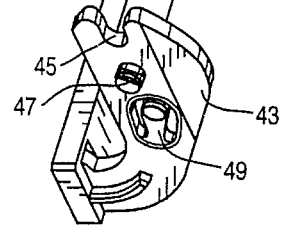
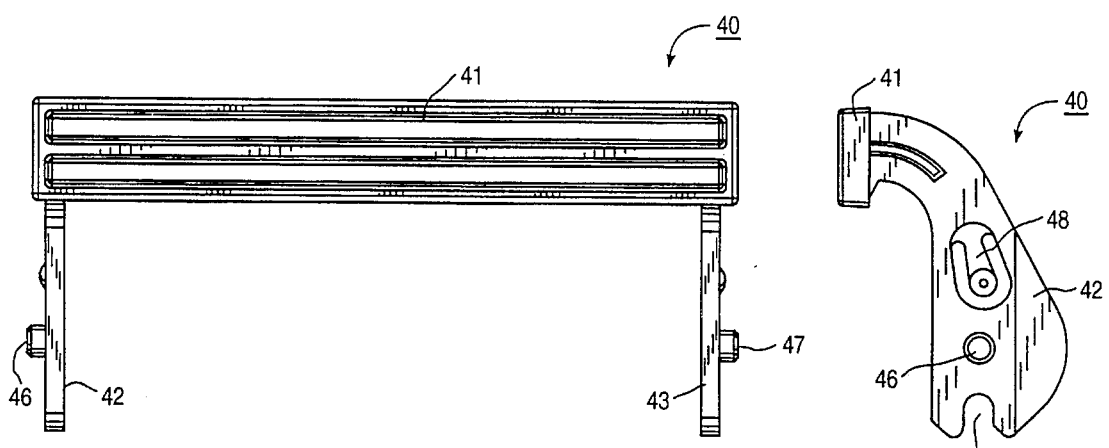

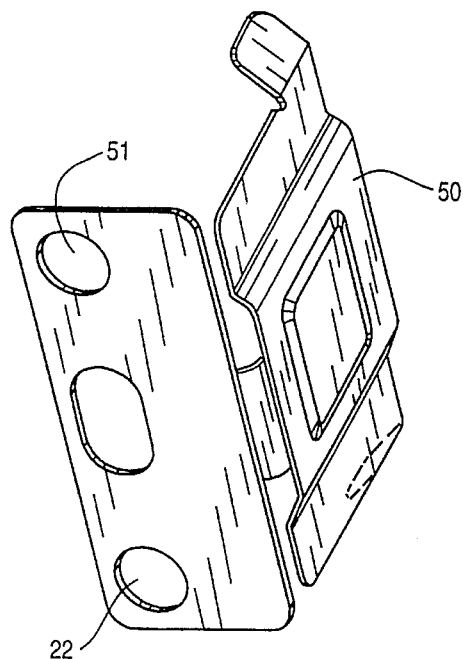
FIG_3
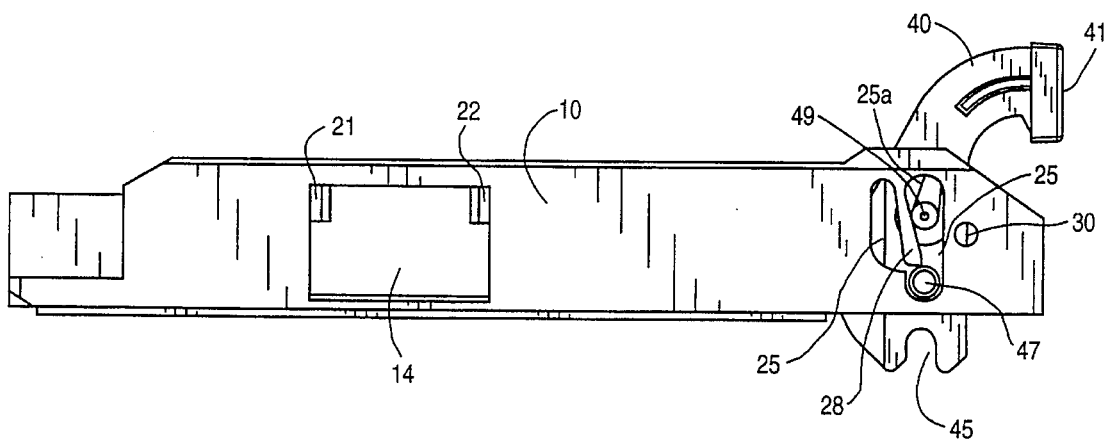
FIG_4A

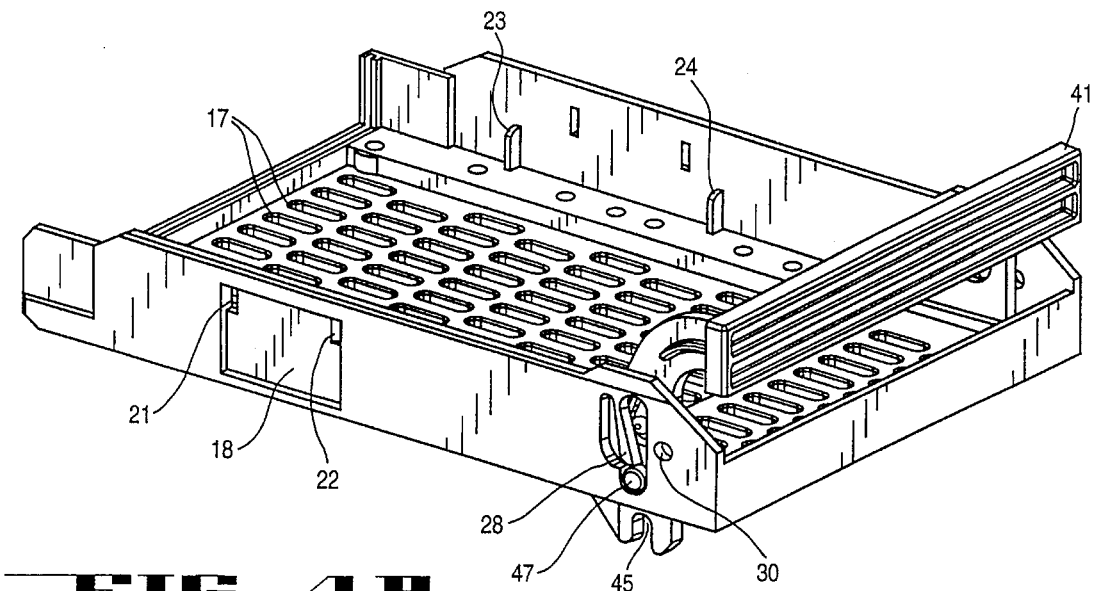
FIG_4B
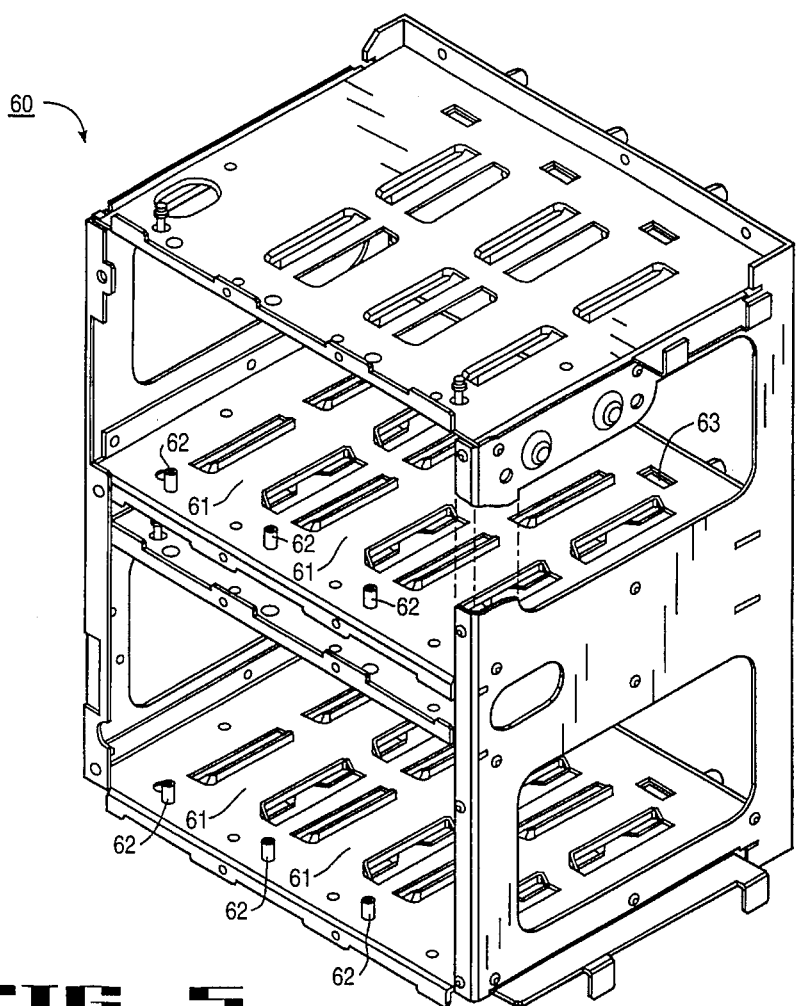
FIG_5

PORTABLE DISK DRIVE CARRIER AND CHASSIS

This is a continuation of application Ser. No. 08/346,039 filed Nov. 29, 1994.

BACKGROUND OF THE INVENTION

1. Field of the Invention

The present invention relates to portable carriers for handling mounted devices. More particularly, the present invention relates to portable carriers and a chassis assembly for housing hot-plug connected hard disk drives.

2. Art Background

Computer systems and information networks today require tremendous amounts of external data storage to satisfy the needs of users. To this end, mechanisms have been developed for housing multiple hard disk drives for storing large volumes of data. A recent advance in this field has been the introduction of "hot swappable" disk drives that may be added to or removed from a disk drive chassis or "cage" while power is being supplied to other disk drives in the cage. This is also referred to as "hot plug" connected disk drives.

Prior disk drive carriers for hot swappable disk drives suffered numerous disadvantages. The disadvantages have included requiring interface conversion circuitry being implemented within the disk drive carrier itself for converting from one connector protocol to another to support hot swappable drive connections not provided for by a previous disk drive chassis backplanes. This interface circuitry greatly increases the cost of the carrier. This excess cost is multiplied by the number of carriers supported by a given chassis configuration.

Another disadvantage of prior disk drive carriers has been the relatively cumbersome method required for locking and removing them from the drive cage. Particularly, prior art systems require two hands for implementing their locking mechanisms for locking the drive carrier into the cage and, likewise, two hands are required for removing them. Further, prior art hot plug disk drive carriers have not provided a convenient mechanism for carrying removed drives.

It can be seen from the foregoing that it would be desirable to provide a hot plug disk drive support apparatus which can be made much more inexpensively than the above-described prior carriers and which provides a simple mechanism for one-hand insertion and locking as well as one-hand removal and carrying of a disk drive carrier.

SUMMARY OF THE INVENTION

From the foregoing, it can be seen that it would be desirable to provide a disk drive carrier for hot swappable "hot plug" disk drives which is inexpensive to manufacture, is relatively simple to lock and unlock in a drive chassis, and provides a convenient mechanism for carrying removed hard disk drives when they are not housed in a drive cage. Accordingly, these are some of the objects of the present invention which are provided by an inexpensive to manufacture hot plug connected hard disk drive carrier.

These and other objects of the present invention are provided by a hard disk drive carrier made of a durable inexpensive polycarbonate suitable for housing a number of different hard disk drive configurations being manufactured today. The disk drive carrier comprises two interconnecting sections, a drive bay for encapsulating and securing the disk drive, and a separate but attachable handle member which also provides an integrated locking mechanism when the drive is in the carrier.

The bay for the hard disk drive carrier is perforated to provide ventilation and protection of the disk drive electronics during handling. Placement flanges protrude inwardly from both internal sidewalls of the drive carrier bay for aligning an inserted disk drive. A ground clip pocket is provided for securing a ground clip through which a mounting screw secures a hard disk drive and also provides a grounding path for the drive's electronics. The bay optionally provides at one end a slotted receptacle for receiving an interface mounting board or connector adapter if required by the protocol of a hard disk drive being supported.

The hard disk drive carrier handle is manufactured from a 20% glass filled polycarbonate. The handle is inserted and interlocks through a mechanism cut into the hard disk drive carrier bay sidewalls. The mechanism for locking the handle into the bay provides an inexpensive interlocking pivot mechanism for the handle arms. The handle portion of the apparatus further extends through the bay to provide a notched groove which interacts with a protruding cylindrical post on the hard disk drive mounting cage.

When the drive carrier is inserted into a hard disk drive chassis, it is guided by grooves defined by the chassis floor. As the carrier is nearly completely inserted, a notched groove of the handle mechanism captures the cylindrical protruding post from the chassis floor and pivots the handle into a position which locks the drive carrier into the drive cage. Removal of the drive carrier is effected by grasping and pulling the handle mechanism of the drive carrier which pivots to release the interlocking mechanism of the drive carrier with the chassis. The removal of the drive carrier may be done with one hand in a single motion, thus providing a convenient mechanism for removing and carrying mounted hard disk drives.

BRIEF DESCRIPTION OF THE FIGURES

The objects, features and advantages of the present invention will be apparent in the following detailed description in which:

FIGS. 1A, 1B and 1C illustrate various views of the bay portion of a hard disk drive carrier in accordance with one embodiment of the present invention.

FIGS. 2A, 2B, 2C, and 2D illustrate various views of the handle mechanism manufactured to interlock with the bay portion of the hard disk drive carrier of the present invention.

FIG. 3 illustrates a grounding clip in accordance with one embodiment of the present invention for grounding a hard disk drive supported by the hard disk drive carrier in accordance with one embodiment of the present invention.

FIGS. 4A and 4B illustrate two views of the assembled hard disk drive carrier of the present invention with the handle mechanism connected to the drive bay.

FIG. 5 illustrates a multiple hard disk drive chassis suitable for receiving the hard disk drive carrier implemented in accordance with one embodiment of the present invention.

DETAILED DESCRIPTION OF THE INVENTION

The present invention provides an apparatus that is inexpensive to manufacture and suitable for mounting "hot plug" hard disk drives for application to a hard disk drive chassis or cage. The present invention will be described in terms of its suitability for mounting computer related hard disk drives, but it should be borne in mind by those of ordinary skill in the art that the principles of the present invention may be extended to carrier and handle mechanisms and the interlocking of those mechanisms with a housing structure for other devices than hard disk drives. It is only one embodiment of the present invention that is tailored to use for mounted hard disk drives. Throughout this detailed description, numerous specific details are set forth such as material types and disk drive protocols, in order to provide a thorough understanding of the present invention. It will be appreciated by one having ordinary skill in the art that the present invention may be practiced without such specific details. In other instances, well known structures and manufacturing techniques have not been described in detail in order to avoid obscuring the subject matter of the present invention.

FIGS. 1A, 1B and 1C illustrate three views of the hard disk drive bay 10 of a hard disk drive carrier in accordance with one embodiment of the present invention. FIG. 1A illustrates an elevated top view while FIG. 1B illustrates an underside view of the bay 10. FIG. 1C illustrates a side-long view of the bay 10. The bay comprises opposing walls 11 and 12 and one end wall 13. The distal end of the bay 10 from end wall 13 is left unobstructed as it is the location for an interface connector for the hard disk drive to be mounted into the bay 10. The open end of the bay 10 for the hard disk drive connector also includes an optional slotted track 15 around the periphery of the interior which may be optionally included for mounting an interface card if required.

The floor of the bay 10, as can be seen in FIGS. 1A and 1B, is perforated with ventilation holes 17. In the illustrated embodiment, the ventilation holes 17 are evenly distributed oval shaped apertures. Other configurations of ventilation holes may be implemented in alternative embodiments.

Sidewall 11 of the disk drive carrier bay 10 includes a pocket 18 for a metal grounding clip. Two apertures 21 and 22 (shown more clearly in FIG. 1C) are provided for securing the ground clip to the bay sidewall. They also provide a mechanism for securing a hard disk drive mounted within the bay and for coupling the grounding clip to the drive's electronics. This provides a grounding path for the disk drive. The grounding clip will be described in more detail further herein with respect to FIG. 3.

Sidewall 12 of the disk drive bay 10 is illustrated showing two of four alignment flanges or ribs 23 and 24 for providing a location mechanism for placing a hard disk drive into the bay 10. In one embodiment, the ribs provide an alignment mechanism for the 4 inch width dimension associated with a conventional 3.5 inch hard disk drive form factor. The ribs also provide lateral support for shock mounted disk drives. In alternative embodiments, differing numbers of alignment flanges may be implemented.

Cut into both sidewalls 11 and 12 of the drive carrier bay 10 are apertures 25 and 26, respectively, which define flexible handle post guides and locking members 28 and 29. As will be described below, with respect to the handle portion of the drive carrier, the handle swing arms are provided with two axial cylindrical insertion posts. The engagement of the cylindrical insertion posts with the receiving apertures 25 and 26 will be described more thoroughly below. There are also provided two axially aligned circular apertures 30 and 31 in opposing sidewalls 11 and 12, respectively, for limiting the pivotal motion of the handle mechanism in a manner to be described below.

Referring now to FIGS. 2A to 2D, the handle mechanism 40 of the hard disk drive carrier of the present invention is illustrated. FIGS. 2A and 2B illustrate off-angle elevated views of the hard drive carrier handle. FIG. 2C is a head on front view, and FIG. 2D is a side-long view of one side of the handle. In one embodiment of the present invention, the handles made of a 20% glass filled polycarbonate material. Other materials may be suitable in alternative designs. The grip portion of the handle 40 in the illustrated embodiment is a rectangular member 41 affixed to the two swing arms 42 and 43. In alternative embodiments, rather than a rectangular member, other geometries for the grip portion of the handle 40 may be implemented to suit aesthetic or other functional desires.

Each swing arm 42 and 43 of the handle 40 is notched at the end with recessed grooves 44 and 45, respectively. As will be described below, these grooves are used to catch a cylindrical post provided in a multiple disk drive cage for pivoting the handle mechanism 40 into a locking position within the overall disk cage.

On the outer surface of each swing arm there is provided protruding cylindrical engaging posts 46 and 47, respectively. These are used to pivotally interlock the handle mechanism to the carrier bay 10 through the apertures 25 and 26 described above with respect to FIG. 1. There are also provided a cut-away click locking members with conical detents 48 and 49 on the two swing arms, respectively.

FIG. 3 illustrates one embodiment of a grounding clip 50 which may be provided in the grounding clip pocket 18 (FIG. 1). The grounding clip 50 is used for grounding a hard disk drive in accordance with one embodiment of the present invention. The grounding clip 50 includes apertures 51 and 52 designed to coincide with apertures 21 and 22 of the ground clip pocket 18. A conducting screw may be used to secure a disk drive mounted within the drive bay 10 via the ground clip apertures. In this manner, a conducting path is provided from the disk drive (not shown) through to the grounding clip. As will be described, the disk drive cage suitable for use with the disk drive carrier of the present invention will provide a conducting contact to the grounding clip 50 of the drive carrier.

FIGS. 4A and 4B illustrate the assembled hard disk drive carrier of the present invention. The handle 40 is pivotally affixed to the carrier bay 10 via the connecting posts 46 and 47. The handle is installed by flexing members 41, 42 and 43 to allow pivot posts 46 and 47 to enter apertures 25 and 26 without engaging interlock slots 52 and 53 (FIG. 1B) in the bay 10. As was described above, cut into each sidewall of the carrier bay 10 is an aperture 25 which defines a flexible locking member 28. Referring to the sidewall shown in FIG. 4A, it can be seen that the engagement post 47 may be aligned with the wider upper portion of the aperture 25. Then, the post may be slid down the aperture, causing a temporary deflection of the flexible member 28 until the engagement post rests in the recessed portion of the aperture 25. The flexible member 28 then returns from its deflected state and pivotally locks the handle into place. As engaged, the handle 40 is free to pivot about the central axis defined by circular posts 46 and 47.

The illustrations of FIGS. 4A and 4B show the handle 40 in the position that would be considered the locked position. This will be described in more detail respect to the operation of engaging the drive carrier with a hard disk drive chassis further herein with respect to FIG. 5. When the handle mechanism 40 is pivoted about the central axis defined by circular posts 46 and 47, the locking protrusion 49 engages the aperture 30 and prevents further forward swing of the handle.

As can be seen from FIGS. 4A and 4B, when the handle mechanism 40 of the drive carrier is engaged with the drive carrier bay 10, the single rectangular cross member 41 provides a convenient mechanism for one-hand carrying of the disk drive mounted in the carrier. It can further be seen that the handle mechanism of the present invention provides a useful system for a single-handed pivoting of the drive carrier locking mechanism implemented through locking notches 44 and 45 of the handle swing arms.

FIG. 5 illustrates a hard disk drive chassis 60 which may be used to receive the drive carrier of the present invention. While the present invention is directed toward a removable drive carrier, reference is made to the disk drive chassis of FIG. 5 to illustrate elements of a drive chassis required for taking advantage of the various aspects present invention. The disk drive chassis 60 illustrated in FIG. 5 is one embodiment suitable for receiving six disk drive carriers such as those described above with respect to the present invention.

The elements required to be implemented within disk drive chassis 60 are the same for each of the receiving slots of the chassis 60. Accordingly, only one set of reference numbers will be used to indicate duplicated elements in the configuration. Of course, those of ordinary skill in the art will recognize that alternate configurations and different numbers of disk drive carriers may be housed by different chassis. Each receiving slot in the drive chassis comprises a U-shape receiving channel 61. At the entry portion of the drive chassis in front of each slot 61, there is implemented a cylindrical locking post 62. At the distal end of each drive slot there is a blocking protrusion 63 which retards the forward advance of a disk drive carrier being inserted into the drive channel. The backplane for the disk drive chassis would be affixed to the wall beyond the blocking protrusion 63. The chassis should also provide a conduction path for contacting with grounding clip 50 for grounding the disk drive when it is inserted into the chassis.

As was described above the pivotal handle arms of the handle mechanism 40 of the present invention are notched with recessed grooves 44 and 45. When a drive carrier is inserted into the drive cage, the handle is in the unlocked position. In the unlocked position, as the drive carrier nears full insertion into the cage, the notched recessed portions 44 and 45 of the drive arms engage the cylindrical locking post affixed to the chassis. This causes the carrier handle to pivot until it reaches the locked position which coincides with a drive carrier reaching the blocking protrusion 63. In this manner, a simple integral locking mechanism is implemented in the drive carrier without excess complexity. Further, when a drive carrier is locked into the cage, it is simple to remove it by grasping the grip member 41 of the locking handle 40 with a single hand and withdrawing it. Upon withdrawal, the handle pivots to free the recessed notches 44 and 45 from the cylindrical post 62 allowing for easy removal of the drive carrier.

The above description has provided a portable disk drive carrier which is inexpensive to manufacture and simple to utilize. As described, only two body portions are needed which may be separately machined. The engagement of the handle portion with the disk drive bay is a simple insertion of post into an aperture. Further, the above-described bay of the present invention provides optional mounting slots for an interface board if necessary and is thus a flexible disk drive carrier. Although the present invention has been described in terms of an illustrated embodiment, those of ordinary skill in the art will appreciate that various modifications and alterations might be made. Accordingly, the scope and spirit of the present invention should be judged in terms of the claims which follow.

What is claimed is:

1. A disk drive carrier adapted to be housed in a disk drive chassis comprising:

an integrated carrying handle and locking mechanism suitable for handling said disk drive carrier and for providing a one-hand activated locking mechanism for locking and unlocking said disk drive carrier in the disk drive chassis;

wherein said carrying handle includes:

first and second swing arms each having a first end, said swing arms for pivotally mounting said carrying handle to said drive bay;

a single cross member having opposing ends, said single cross member being coupled to said first ends of said first and second swing arms proximal to said opposing ends of said single cross member; wherein said first and second swing arms have second ends, said second ends each having locking post engagement grooves;

first and second axially aligned cylindrical attachment posts protruding from said first and second swing arms, respectively; and a drive bay for receiving and holding a hard disk drive, said drive bay including first and second opposing side walls, each side wall having a front end and defining an aperture, said aperture aligned proximal to said front end for receiving attachment posts associated with the carrying handle; wherein said apertures each define a flexible locking member which allows for the pivotal locking of said attachment posts.

2. The hard disk drive carrier of claim 1 wherein the carrying handle is detachably coupled to the drive bay.

3. The hard disk drive carrier of claim 2 wherein said carrying handle further comprises first and second click locking members having conical detents, disposed on the first and second swing arms, respectively.

4. An apparatus for housing hard disk drives comprising:

a disk drive carrier for receiving and holding a hard disk drive, said disk drive carrier including a handle having swing arms having notched grooves;

said carrier including first and second opposing sidewalls, each having a front and each defining an aperture aligned proximal to said front end, said apertures for receiving engagement posts associated with said handle; wherein said apertures each define a flexible locking member which allows for the pivotal locking of said engagement posts; and a disk drive chassis for receiving said drive carrier, said chassis having locking posts for engaging said notched grooves associated with said handle swing arms.

5. The apparatus of claim 4 wherein said chassis includes a guide channel for directing said disk drive carrier into said chassis.

6. The apparatus of claim 5 wherein said chassis further includes a stopping protrusion for limiting the inward depth said disk drive carrier may be inserted into said chassis.

7. The apparatus of claim 6 further comprising:

a grounding clip associated with a sidewall of said disk drive carrier; and a conduction path associated with said disk drive chassis for contacting said grounding clip and providing a grounding path.

8. The apparatus of claim 4 wherein each sidewall has an opening and an integral flexible member that protrudes into said opening, said flexible member having a fixed end being fixably coupled to the sidewall and a free end opposite to the fixed end for frictionally locking said engagement post.

9. The apparatus of claim 8 wherein the integral flexible member and the sidewall define a first and second groove; the first groove for guiding the engagement post, and the second groove for guiding a conical detent;

wherein the engagement post in a locked position is frictionally locked between the free end of the flexible member and sidewall;

wherein in an unlocked position, the engagement post is disposed in the first groove.

10. A hard disk drive carrier comprising:

a drive bay for receiving and holding a hard disk drive; and an integrated carrying handle and locking mechanism suitable for handling said disk drive carrier and for providing a one hand locking mechanism suitable for locking and unlocking said disk drive carrier in a multiple disk drive chassis, said carrying handle including first and second swing arms each having a first end, said swing arms for pivotally mounting said carrying handle to said drive bay, said first and second swing arms having second ends, said second ends each having locking first engagement grooves notched therein; and a single cross member having opposite ends, said single cross member being coupled to said first end of said first and second swing arms proximal to said opposing ends to said single cross member, said carrying handle further including first and second axially aligned cylindrical attachment posts protruding from said first and second swing arms respectively;

said drive bay including first and second opposing sidewalls, each having a front end and each defining an aperture proximal to said front end, said apertures for receiving attachment posts associated with said carrying handle, and wherein said apertures each define a flexible locking member which allows for the pivotal locking of said attachment posts.

11. The hard disk drive carrier of claim 10 further comprising a grounding clip pocket defined by an outside recess in said first sidewall, said grounding clip pocket defining an aperture for receiving a grounding clip securing means.

12. The hard disk drive carrier of claim 11 wherein said drive bay further defines a plurality of perforations for ventilation and electronics protection.

13. The hard disk drive carrier claim 12 wherein said drive bay further comprises a plurality of guide flanges protruding inwardly from said second sidewall.

14. The hard disk drive carrier of claim 13 further comprising an interface card receiving channel defined by a groove in said first and second sidewall and said drive bay.

* * * * *